Figure 1:
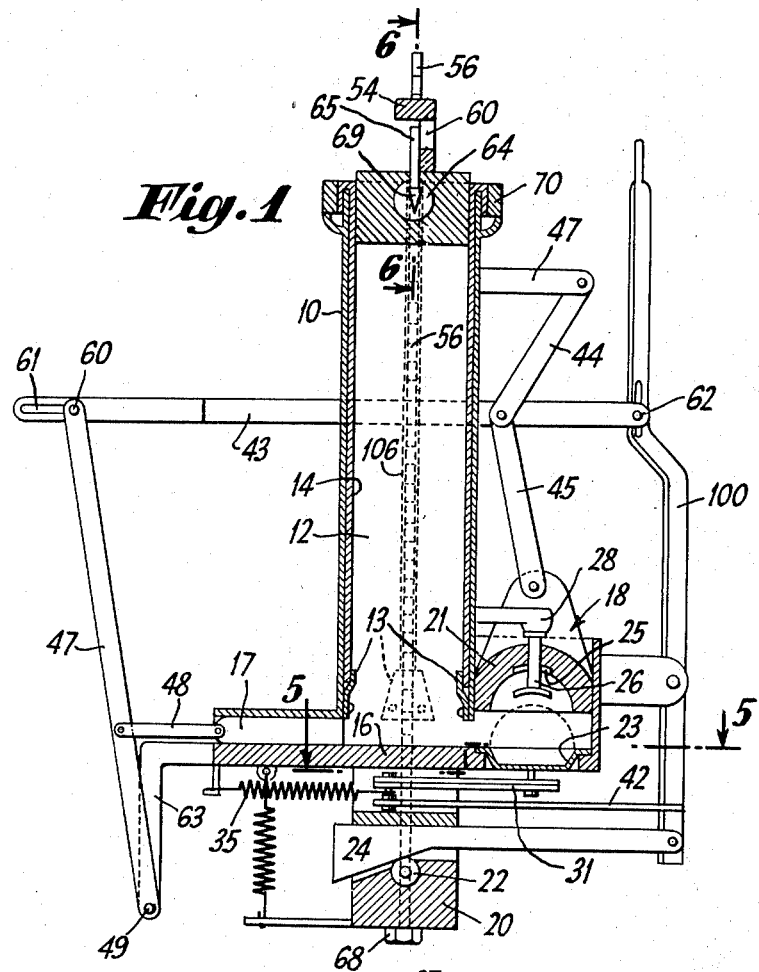

May 12, 1953  
A. J. MURPHY  
2,638,064  
ICE CREAM DISPENSING MACHINE  
Filed Oct. 30, 1948  
3 Sheets-Sheet 1

INVENTOR  
ARTHUR J. MURPHY  
BY Charles H. Brown  
ATTORNEY

May 12, 1953 A. J. MURPHY 2,638,064
ICE CREAM DISPENSING MACHINE
Filed Oct. 30, 1948 3 Sheets-Sheet 2

INVENTOR
ARTHUR J. MURPHY
BY Charles H. Brown
ATTORNEY

May 12, 1953  A. J. MURPHY  2,638,064
ICE CREAM DISPENSING MACHINE
Filed Oct. 30, 1948  3 Sheets-Sheet 3
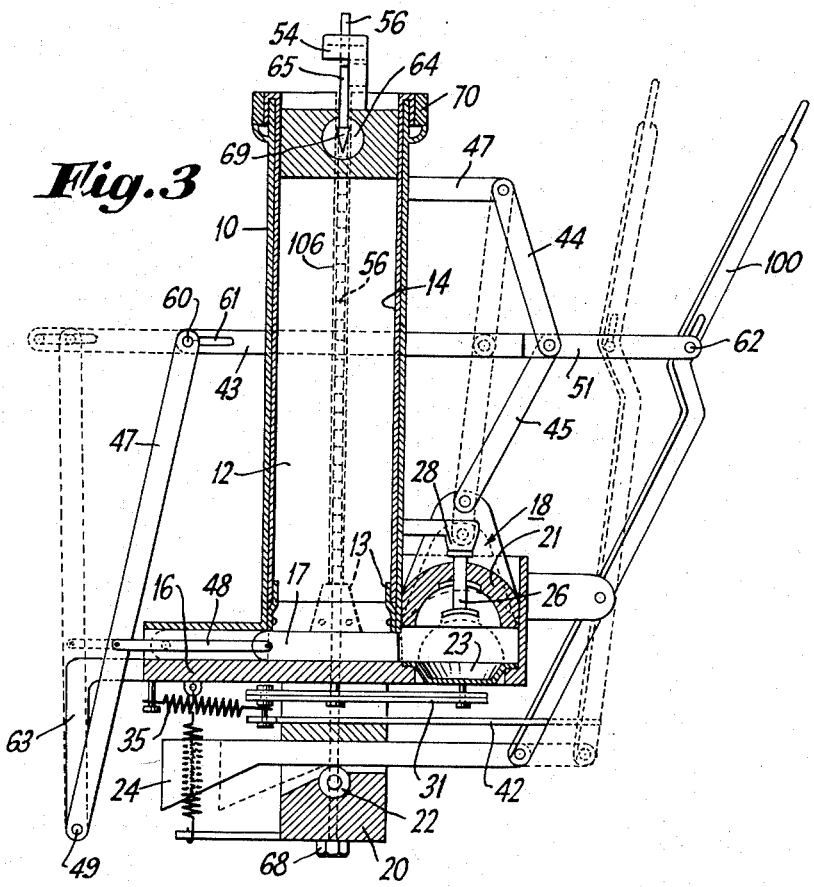
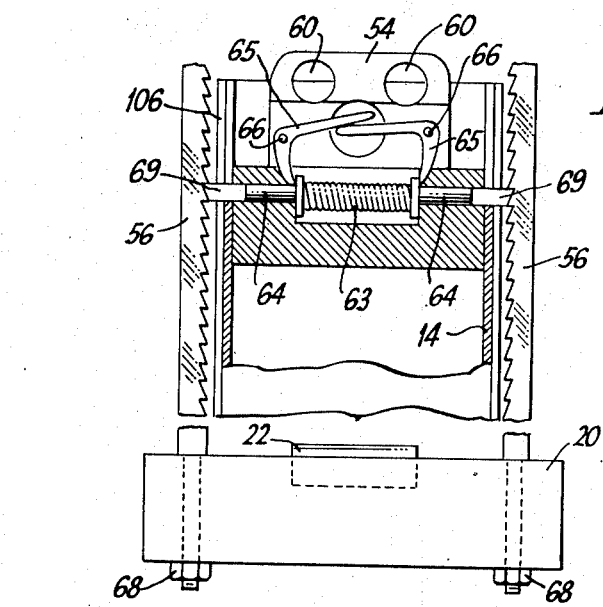
INVENTOR
ARTHUR J. MURPHY
BY Charles H. Brown
ATTORNEY Patented May 12, 1953

2,638,064

UNITED STATES PATENT OFFICE 2,638,064

ICE CREAM DISPENSING MACHINE

Arthur J. Murphy, New York, N. Y., assignor of one-half to S. Lawrence Atkins, New York, N. Y.

Application October 30, 1948, Serial No. 57,497

8 Claims. (Cl. 107—8)

This invention relates to an ice cream dispensing machine, and has for one of its objects to provide a machine which is simple to construct, rugged, easy to maintain, and positive acting, to cut and deliver the cream in a desired form in response to a manual or automatic operation.

Another object of the invention is to provide an improved ice cream dispensing machine which will cut a predetermined quantity of cream from a larger mass, mold the cut cream into a desired form, and deliver the molded cream to a suitable delivery aperture, in a sanitary manner with a minimum of wastage.

A further object of the invention is to provide an ice cream dispensing machine which will cut a slice of cream of predetermined amount from a larger mass in response to the movement of a lever in one direction, and will mold the cut cream and deliver the same to a delivery opening in response to the return movement of the lever, thus assuring the proper positioning of the lever at the start of each cycle of operations.

Briefly stated, the ice cream dispensing machine of the invention comprises a container for accommodating a relatively large mass of ice cream, a weight at one end of the container adapted to rest on the cream for enabling proper pressure to be placed on the cream at all times, a cutter or shear knife for slicing a predetermined amount of cream from the larger mass, a mold for receiving the cut cream and for molding the same into a desired form, and an actuating lever suitably linked to the weight, shear knife and mold for assuring proper coordination and sequential operation of these elements with movement of the lever.

A feature of the invention resides in the linkage mechanism between the lever and the shear knife, mold, and weight (feeding mechanism), and which in response to movement of the lever in one direction causes the cutting of the cream, and in response to movement of the lever in the opposite direction after the cutting operation, causes the molding and ejection of the cut cream, and also movement of the weight for exerting a continuous pressure on the cream.

Another feature of the invention is the mold which has two halves, one-half of which is made in the form of a pair of jaws for permitting ejection of the cream after it has been molded, and the other half of which includes a stripper or spanker for removing or jarring the molded cream pellet free from the inner surface of this half of the mold.

Still another feature is the weight or feeding mechanism which includes a rack arrangement automatically responsive to the return movement of the actuating lever to its starting position for causing the mass of cream to occupy the void left by the severance of the slice of cream from the larger mass of ice cream in the container.

An advantage of the ice cream dispensing machine of the invention is that all steps in the operation of the machine result from positive action of the manually or automatically operable actuating lever. This lever must be returned to its starting position before there is any ejection of the cut portion of ice cream, thus insuring proper conditioning of the machine for each complete cycle of operations.

Figure 2:
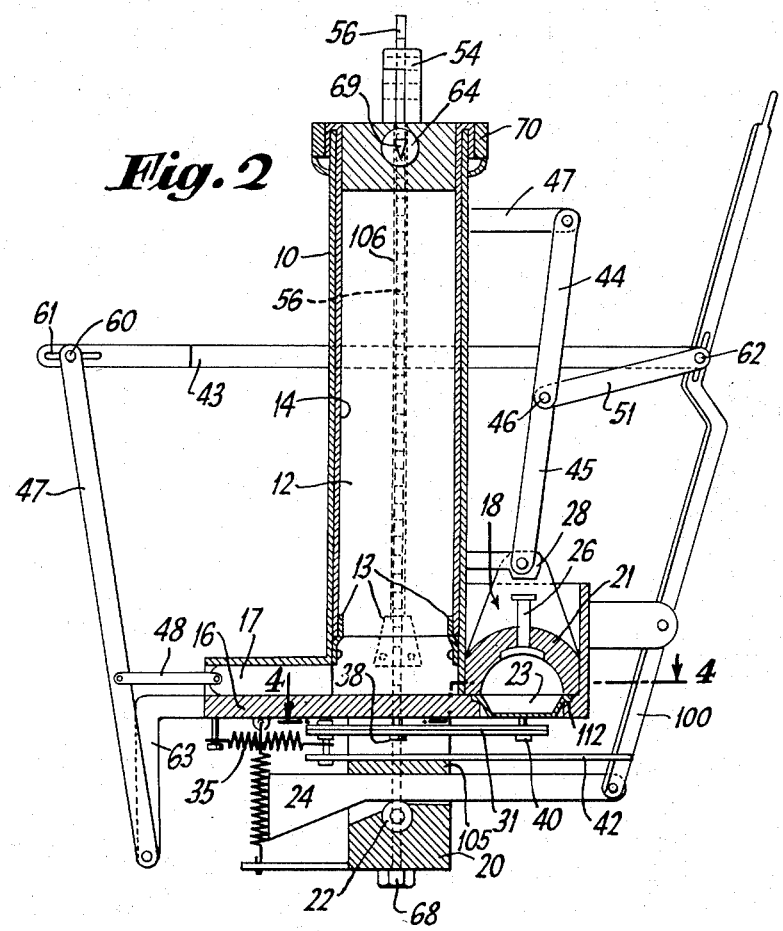

Other objects, features and advantages will appear from a reading of the following description of the invention, in conjunction with drawings, wherein:

Figs. 1, 2 and 3 are sectional elevations of the ice cream dispenser of the invention during different steps in the operation of the machine. Fig. 1 is the position of the machine at rest or start of each cycle of operations. Fig. 2 is the second position of the machine after the cycle of operations has commenced. Fig. 3 shows the third and fourth positions of the machine. The third position is shown in solid lines, while the fourth position (corresponding to the actual molding step) is shown in phantom or dash lines.

Figure 5:
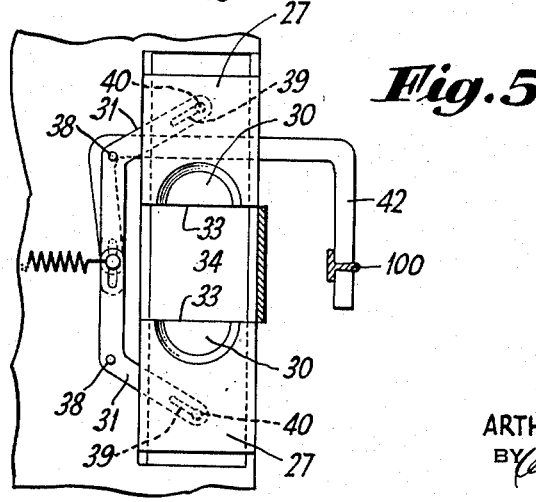
Figure 4:
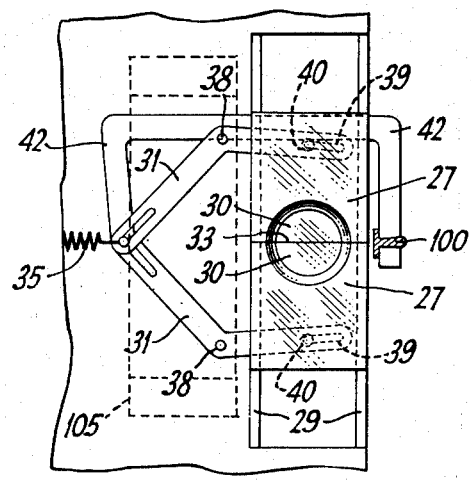

Figs. 4 and 5 are cross-sections of the lower half of the mold along the lines 4—4 and 5—5, respectively, of Figs. 2 and 1.

Fig. 6 is a cross-section of Fig. 1 along the line 6—6, and shows the details of the weight or feeding mechanism.

Throughout the figures of the drawing, the same parts are represented by the same reference numerals.

Referring to Figs. 1, 2 and 3 in more detail, there is shown an ice cream receptacle 10; for example, a metallic can for accommodating a large bulk or mass of ice cream 12. The cream 12 is shown contained within a paper container 14, and this container which is inserted into the receptacle 10 from the top may hold five or ten gallons of cream. Receptacle 10 and container 14 are both preferably square, although if desired these can be of cylindrical shape or have other shapes. The paper container 14 is held in position within the receptacle 10 by means of metallic fingers 13 which are positioned around the inside of the receptacle 10 and near the lower end thereof, in order to prevent the paper of the container from being dispensed with the ice cream as it is sliced or severed from the main mass or bulk. A weight 54 on top of the cream in the container 14 in conjunction with a rack mechanism described later, serves to feed the cream into the cut-off position.

At the lower end of the receptacle 10 and above a platform 16 is a confined space through one end of which a cutter or shear knife 17 in the form of a rectangular closed slab (solid or hollow) is adapted to pass for slicing or cutting a predetermined amount of cream from the bulk 12. This cutter may be likened to a plunger. A passage is provided at the other end of this confined space, and this passage communicates with the interior of a mold 18, for enabling the cut or sliced portion of cream to pass into the mold.

Below the platform 16 is a U-shaped yoke 20 supporting a roller 22 and a pair of ratchet racks 56 forming part of the weight mechanism. A wedge-shaped cam 24 engages roller 22 and is adapted to ride thereon. The details of this feeding mechanism are shown more clearly in Fig. 6 and will be described later.

The mold 18 is made up of two halves 21 and 23. The upper half 21 is relatively thick, has a hollow interior in the form of a hemisphere, and is slidable in a vertical direction toward and away from the lower half of the mold. The interior shape of the upper half 21 conforms to the shape to which the ice cream is to be molded. Obviously, any desired shape of mold can be employed. An arcuate-shaped recess portion 25 in the upper interior surface of the half 21 is dimensioned to accommodate the arcuate-shaped part of a spanker or stripper element 26. The purpose of the stripper element 26 is to overcome the adherence of the molded pellet of ice cream to the upper half 21 of the mold, after the molding operation has been completed, and to cause the molded pellet to be ejected from the bottom of the lower half 23 of the mold. In the position shown in Fig. 1, the top of the spanker or stripper element 26 is shown engaging a stop 28 for causing the stripper to enter the interior of the mold and thus eject the molded pellet.

The lower half 23 of the mold 18 is stationary relative to the upper half of the mold, except for the pair of jaws 27 which slide in a horizontal plane within channels 29. This is shown in more detail in Figs. 4 and 5. The jaws 27 move toward or away from each other in response to the action of bell cranks 31 and are formed with an interior depressed portion 30 at the location immediately underneath the hollow of the upper half 21 of the mold. These jaws have edges 33 which abut when the jaws are closed. Note Fig. 4. When the jaws are open as in Fig. 5, there is an opening 34 therebetween through which the molded pellet of ice cream is ejected. The jaws 27 of the lower half of the mold are normally held in closed or gripping position, as shown in Fig. 4, by the action of a coiled spring 35. The bell cranks 31 are each pivotally mounted at a point 39 intermediate its ends and provided at the end which engages the jaws 27 with a slot in which rides a pin 40 fastened to the slidable jaw. When the pull lever 42 which is secured to the adjoining ends of the bell cranks 31, exerts pressure against the coil spring 35, as in the position of Fig. 5, the jaws open up. Pull lever 42 is linked to a lever 100.

Lever 100 is linked to the upper half 21 of the mold 18 by means of a lever 51 and arms 44, 45. Arms 44 and 45 are pivotally secured to the link 51 at pin 46 located at the adjoining ends of these arms. The other end of arm 44 is pivotally secured to extension 47, in turn fixedly mounted on the receptacle 10. The other end of arm 45 is pivotally secured to the upper half 21 of the mold. It will thus be apparent that motion of the arm 100 to the right of the position of Fig. 1 will cause link 51 to move to the right and cause the adjoining ends of arms 44 and 45 also to move to the right. As a result of this, the upper half 21 of the mold will be forced downwards towards the lower half 23 of the mold.

Lever 100 is also linked to a substantially horizontally positioned arm 43 which in turn is linked to the shear knife or cutter 17 by means of arm 47 and link 48. Arm 47 is pivotally mounted at its lower end at 49 to a right angle extension 63 of the platform 16. The upper end of arm 47 is fastened to a pin 60 which slides within a slot 61 in the arm 43. The link 48 is positioned intermediate the ends of arm 47 and is fastened at its ends to the arm 47 and to the cutter 17, as shown. It should be noted that lever 100 is also provided with a slot in which rides a pin 62 to which the right hand ends of arm 43 and link 51 are fastened.

It will be seen that elements 43, 44, 45, 47, 48 and 51, in association with their interconnecting pins and the slots in which some of these pins move, constitute a linkage between the lever 100 and all movable parts of the ice cream dispensing machine. These component elements are dimensioned to provide the required tolerances in their movements, and to achieve the results desired.

*Operation of system*

A description of the operation of the ice cream dispensing machine will now be given. Fig. 1 shows the machine in the rest or starting position at the beginning of the cycle of operations. Lever 100, which may be manually or motor-operated, is movable in the plane of the paper on which the drawing is made, and is in such position that the shear knife or cutter 17 is to the left of the receptacle 10 and completely clear of the column of ice cream 12 whose lowermost surface rests upon the platform 16. The column of ice cream has been forced down by the weight or feeding mechanism at the end of the cycle of operations because of movement of the wedge-shaped cam 24 over the roller 22 in response to the movement of lever 100 to the position of Fig. 1. This will be described later in connection with Fig. 6. In the position of the machine shown in Fig. 1, the arms 44 and 45 have raised the upper half 21 of the mold 18, and the stripper pin or spanker 26 has been pushed down through the upper half 21 by engagement with the stop or knockout 28. The jaws 27 of the lower half 23 of the mold are now open, as shown in Fig. 5, thus providing an opening 34 between the edges of the jaws and through which the molded pellet of ice cream is ejected for delivery to any suitable cream holder, such as an edible cone or a dish. The opening of the jaws 27 are caused by the action of lever 100 in the position shown in Fig. 1, exerting a force on pull lever 42 against the pressure exerted by coil spring 35 to spread apart bell cranks 31.

Fig. 2 shows the second step in the cycle of operations. The lever 100 is pulled slightly to the right so as to straighten out arms 44 and 45 through the action of the intermediary link 51. The straightening out of arms 44 and 45 causes the upper half 21 of the mold to descend vertically. The upper end of stripper pin 26 frees itself from the stop or knock out 28 and may assume the position indicated in Fig. 2. The lever 100 no longer forces lever arm 42 against the coil spring 35, and the jaws 27 of the lower half 23 of the mold 18 close, as shown in Fig. 4. The wedge-shaped cam 24 no longer rides upon roller 22 as in Fig. 1, and effects a result to be described later in connection with a description of the operation of the weight or feeding mechanism of Fig. 6. The shear knife or cutter 17 is still positioned to the left and completely clear of the column of ice cream 12.

The third step in the cycle of operations is shown by the solid lines of Fig. 3 illustrating the lever at the extreme limit of its travel toward the right. Arms 43, 44, 45, 47, 48 and 51 are also at the extreme limit of travel toward the right. In this position, the arms 44 and 45 have been forced to the right by the action of link 51, and arm 45 has raised the upper half 21 of the mold so as to permit a cut or slice of ice cream to enter the mold between both halves thereof. The cutter or shear knife 17 has been forced to the right by link 48 in response to movements of arms 47 and 43, and this movement of the cutter has sliced off a predetermined amount of cream from the bulk or mass in container 14 and pushed the cut off portion of cream out from under the column 12 and into the space under the upper half 21 of the mold. The lower half 23 of the mold has its jaws 27 in closed or gripping position in Fig. 4. The stripper pin 26 again engages the stop or knock-out 28, but it above the cream to be molded.

In the fourth position of the cycle of operations, shown by the dotted lines of Fig. 3, the lever 100 is being moved toward the left. The arms 44 and 45 are straightened out, and the upper half 21 of the mold has been forced down upon the ice cream positioned in the space within the mold. This fourth position corresponds to that of Fig. 2. As a result of this, the slice of ice cream within the mold has been moulded or shaped between the upper and lower halves of the mold to take on the appearance of the top part of a cone-like pellet. The jaws 27 of lower half 23 of the mold are in the closed or gripping position in this fourth step in the cycle. The cutter or shear knife 17 is now underneath the column of bulk ice cream 12, and the right hand flat surface of the slab-like cutter acts as a back stop to prevent the ice cream within the mold from escaping or leaking out from the mold into the passage-way occupied by the cutter while the upper half of the mold is descending. All of the cream in the mold is thus forced to flow into the space between the two halves of the mold. The stripper pin 26 is now forced up by the ice cream being molded so that the lower arcuate-shaped part of the pin rests within the arcuate recess 25 in the upper half of the mold.

The last position of the machine corresponds to the rest or first position shown in Fig. 1, in which the lever 100 returns to the extreme left or other limit of travel. In this position, as described above in connection with Fig. 1, the upper half 21 of the mold is raised, the jaws 27 of the lower half 23 of the mold opened, and the stripper pin 26 caused to descend from the recess 25 so as to eject the molded ice cream pellet through the opening 34 formed in the lower half of the mold. In Fig. 1, the shear knife or cutter 17 has been retracted to the extreme left position so as to be clear of the column of ice cream 12.

The manner in which the weight or feeding mechanism functions will now be described with particular reference to Fig. 6. The heavy weight 54 adapted to rest on the ice cream within the container 14 is provided with a pair of finger holes 60 for enabling the weight to be lifted out of the receptacle 10. This weight is also provided with a pair of pins 64 disposed on opposite sides of a coil spring 63. The opposed ends of pins 64 travel in longitudinal slots 106 in the receptacle 10 in order to engage the ratchet racks 56 on the outside of the receptacle. The ends of pins 64 abutting the coil spring 63 have flat heads so as to provide a relatively large surface area confronting the ends of the spring. A pair of bell cranks 65 pivotally positioned intermediate the ends at 66 serve to compress the spring 63 when the weight is lifted by the finger holes 60. On opposite sides of the receptacle and engaging the pins 64 are two ratchet racks 56 which terminate in bolts passing through the block 20 at the bottom of the machine, and fastened to this block 20 by means of nuts 68. Each pin 64 at the end remote from the coil spring 63 is provided with a sharp V-shaped edge 69 for cutting the paper container 14 as the weight descends after each cycle of operation. It should be noted that the pins 64 are well above the upper surface of the ice cream, so that the cutting or splitting of the paper container will not cause cream to interfere with the ratchet and pins.

In order to cause the weight 54 to descend at the end of each cycle of operation, there is provided a wedge-shaped cam 24 which rides on roller 22 positioned in the block 20. The return movement of lever 100 to the rest position of Fig. 1 causes the wedge cam 24 to ride upon the roller by virtue of the linkage to lever 100, as indicated in Fig. 1. This action of the cam 24 lowers the block 20 and forces the ratchet racks 56 and the engaging weight 54 containing the pins 64 to descend. When the lever 100 is moved to the right, as shown in Figs. 2 and 3, the downward force on the block 20 is removed because the cam 24 is now pushed to the left, and the ratchet racks 56 rise; however, due to the weight of the mechanism 54, the pins 64 remain in their last position as the racks rise, and new teeth on the ratchet racks engage the pins 64 to maintain the pins 64 and the weight in the lowered position. It will thus be seen that the ratchet racks 56 are pulled down by the sliding action of the wedge cam 24 as it is pulled forward by the restoration of lever 100 at the end of the cycle of operations. This causes the ice cream to feed into the void left by the return of the shear knife to its clear position.

Block 20 has a cut away portion as shown in Figs. 1, 2 and 3 to enable the wedge-shaped end of cam 24 to ride upon the roller 22.

Above the straight upper surface of cam 24 is a U-shaped block 105 for restraining movement of the cam 24 and for supporting arm 42. The U-shaped block 105 is provided with an aperture for enabling bell cranks 31 and lever 42, of the mechanism for controlling the jaws of the lower part of the mold, to pass therethrough.

The lifting of the weight 54 by hand will cause the bell cranks 65 to compress the coil spring 63, thus relieving outward pressure of the pins 64 on the ratchet racks 56, and enabling the pins 64 to move free of the ratchet racks.

At the top of the receptacle 10 there is provided a suitable clamp 70 for clamping the top of the paper container 14 in folded position to the top of the receptacle. This action enables the weight 54 to be placed directly on the ice cream.

It should be understood that in practice the receptacle 10 will be surrounded by a compartment containing a refrigerating medium, and the dispensing machine of the invention can, if desired, be associated with a cam-operated mechanism, whereby the insertion of a coin will automatically complete a single cycle of operations and cause a slice of ice cream or a molded cone of cream to be dispensed.

What is claimed is:

1. In a machine for dispensing a frozen confection, a hollow vertically arranged receptacle adapted to be filled with said frozen confection in a paper wrapper, means secured to the top of said receptacle for clamping said paper wrapper thereto, a weight for forcing said frozen confection from the bottom of said receptacle, vertically positioned ratchets on opposite sides of said receptacle, pins secured to said weight above the bottom thereof for engaging the teeth of said ratchets, said pins having V-shaped edges for cutting said paper wrapper, a yoke underneath said receptacle fastened to said ratchets, a roller mounted on said yoke, a wedge-shaped cam having a sloping lower edge which engages said roller for exerting downward pressure on said yoke to thereby communicate said pressure to said ratchets, and means for actuating said wedge-shaped cam to ride upon said roller.

2. In an ice cream dispensing machine, in combination a container for bulk ice cream, a separable mold including a part which opens to permit the molded cream to drop therefrom, a cutter for slicing a portion of the cream from the bulk ice cream and for pushing said sliced portion into said mold, feeding mchanism for forcing the cream in said container to occupy a position where it can be cut by said cutter, an actuating element, and separate linkages between said actuating element and said mold, cutter and feeding mechanism, said linkages being responsive to movement of said actuating element for operating said cutter, mold and feeding mechanism in the order named, said feeding mechanism including a weight for forcing ice cream from said container, vertically positioned ratchets on opposite sides of said container having teeth engaging said weight, a yoke underneath said container fastened to said ratchets, a roller mounted on said yoke, a wedge-shaped cam having a sloping edge which engages said roller for exerting downward pressure on said yoke to thereby communicate said pressure to said ratchets, and means linked to said wedge-shaped cam for causing the same to ride upon said roller.

3. In an ice cream dispensing machine, in combination, a hollow vertical container for a relatively large mass of said cream, a horizontal reciprocating plunger-type cutter located below said container for severing a predetermined amount of cream from said large mass, actuating means linked to said cutter for moving said cutter from a position on one side of said container to a location underneath and bridging said container, a mold on the other side of said container in alignment with said cutter to receive cream severed by said plunger-type cutter, said mold having a vertically reciprocating part positioned above a pair of horizontally movable jaws, said jaws being linked to and responsive to movement of said actuating means for separating to permit the molded cream to drop from said mold, said vertically reciprocating part of said mold also being linked to and responsive to movement of said actuating means for stripping the molded cream from said reciprocating part.

4. In an ice cream dispensing machine, in combination, a container of bulk ice cream, a cutter horizontally movable located below said container for separating a portion of said ice cream from said bulk ice cream, said cutter in its rest position being located to one side of said container, a mold located on the opposite side of said container and having an opening in alignment with said cutter to receive the ice cream severed by said cutter, said mold having a vertically movable upper part and a lower part constituted by a pair of horizontally movable jaws, a lever for operating said machine, independent linkages between said lever and said cutter and said upper and lower parts of said mold, said linkages being connected to said lever at spaced points intermediate the ends thereof, feeding mechanism for forcing the cream in said container into a position to be cut by said cutter, and a link between the lower end of said lever and said feeding mechanism, said lever being pivotally secured to said last link, whereby movement of said lever actuates said cutter, mold and feeding mechanism.

5. In an ice cream dispensing machine, in combination, a container for bulk ice cream, a separable mold on one side of said container and including a horizontally movable part which opens to permit the molded cream to drop therefrom, a plunger-type cutter in alignment with said mold and adapted in a condition of rest to occupy a position on the other side of said container, feeding mechanism for forcing a portion of the cream in said container to occupy a position where it can be severed and moved by said cutter into said mold, and means for intermittently operating said mold part and said feeding mechanism, said means including a manually operable lever and separate linkages coupling said lever at different points in the length thereof to said mold and cutter.

6. In a machine for dispensing ice cream, a receptacle adapted to be filled with ice cream, a weight for forcing ice cream from said container, vertically positioned ratchets on opposite sides of said container having teeth engaging said weight, a yoke underneath said container fastened to said ratchets, a roller mounted on said yoke, a wedge-shaped cam having a sloping lower edge which engages said roller for exerting downward pressure on said yoke to thereby communicate said pressure to said ratchets, and means for actuating said wedge-shaped cam to ride upon said roller.

7. In an ice cream dispensing machine, in combination, a holder for ice cream, a horizontally reciprocating plunger type of cutter for severing a predetermined amount of cream from the larger mass in said holder, a separable mold having a vertically reciprocating upper part and a lower part constituted by a pair of horizontally movable jaws, said mold having a mouth located between said parts when said parts are separated and in alignment with said cutter for receiving the cream severed by said cutter, and means for actuating said cutter and mold in such timed relation that a charge of cream is delivered to said mouth by said cutter when said vertically reciprocating part is at the limit of its travel in a direction away from said lower part, and said cutter does not commence to return to its starting position until after the vertically reciprocating part has moved to its other limit of travel adjacent said lower part, said means including a manually operable lever and separate linkages between different points on said lever and said mold parts and cutter.

8. In an ice cream dispensing machine, a separable mold into which predetermined amounts of cream are delivered, said mold including a vertical reciprocating upper part having a recess portion located in the interior of said mold and a horizontally reciprocating lower part, and a vertically movable stripper element positioned in said recess in said upper part for overcoming any tendency of the molded cream to adhere to said reciprocating part, means for limiting vertical movement of said stripper element to a point lower than the extreme upper position to which said upper part of the mold moves, a plunger for forcing ice cream into said recess, and a common actuating element for said plunger and said mold.

ARTHUR J. MURPHY.

References Cited in the file of this patent
UNITED STATES PATENTS

| Number | Name | Date |
| --- | --- | --- |
| 999,970 | Ebel | Aug. 8, 1911 |
| 1,068,153 | Mittendorf | July 22, 1913 |
| 1,250,470 | Kennedy | Dec. 18, 1917 |
| 1,412,727 | Walsh | Apr. 11, 1922 |
| 1,421,601 | Speck | July 4, 1922 |
| 1,607,765 | Levy | Nov. 23, 1926 |
| 1,685,250 | Key | Sept. 25, 1928 |
| 1,686,309 | Zabriskie | Oct. 2, 1928 |
| 1,696,606 | Hundemer | Dec. 25, 1928 |
| 1,758,028 | Brown | May 13, 1930 |
| 1,761,875 | Cordell et al. | June 3, 1930 |
| 1,787,605 | Waldman | Jan. 6, 1931 |
| 1,837,592 | Skoverski | Dec. 22, 1931 |
| 1,981,469 | Rundell | Nov. 20, 1934 |
| 1,983,942 | Moroney et al. | Dec. 11, 1934 |
| 2,239,046 | Lloyd | Apr. 22, 1941 |
| 2,385,579 | King et al. | Sept. 25, 1945 |
| 2,477,726 | Davis | Aug. 2, 1949 |